US007013074B2

(12) United States Patent
Battey et al.

(10) Patent No.: US 7,013,074 B2
(45) Date of Patent: Mar. 14, 2006

(54) OPTICAL CONNECTION CLOSURE HAVING AT LEAST ONE CONNECTOR PORT

(75) Inventors: Jennifer A. Battey, Euless, TX (US); Guy Castonguay, Ft. Worth, TX (US); Donnie R. Clapp, Jr., Ft. Worth, TX (US); Terry D. Cox, Keller, TX (US); Brett A. Menke, Keller, TX (US); Jason B. Reagan, The Colony, TX (US); Chanh C. Vo, Arlington, TX (US)

(73) Assignee: Corning Cable Systems LLC, Hickory, NC (US)

( * ) Notice: Subject to any disclaimer, the term of this patent is extended or adjusted under 35 U.S.C. 154(b) by 0 days.

(21) Appl. No.: 10/774,266

(22) Filed: Feb. 6, 2004

(65) Prior Publication Data
US 2005/0175307 A1 Aug. 11, 2005

(51) Int. Cl.
*G02B 6/00* (2006.01)
*G02B 6/36* (2006.01)

(52) U.S. Cl. .......................... 385/135; 385/136; 385/76
(58) Field of Classification Search ................ 385/135, 385/134, 55, 59, 76, 78, 136
See application file for complete search history.

(56) References Cited

U.S. PATENT DOCUMENTS

| 5,004,315 A | 4/1991 | Miyazaki ................. 350/96.15 |
| 5,042,901 A | 8/1991 | Merriken et al. ............ 385/135 |
| 5,495,549 A * | 2/1996 | Schneider et al. ........... 385/135 |
| 5,778,122 A | 7/1998 | Giebel et al. ................. 385/55 |
| 5,892,870 A | 4/1999 | Fingler et al. ................ 385/59 |
| 6,152,767 A | 11/2000 | Roosen et al. .............. 439/587 |
| 6,579,014 B1 | 6/2003 | Melton et al. ................. 385/76 |
| 6,621,975 B1 | 9/2003 | Laporte et al. ............. 385/135 |
| 6,648,520 B1 | 11/2003 | McDonald et al. ........... 385/78 |
| 6,766,094 B1 * | 7/2004 | Smith et al. ................. 385/135 |
| 6,798,967 B1 * | 9/2004 | Battey et al. ............... 385/135 |
| 6,856,748 B1 * | 2/2005 | Elkins et al. ............... 385/135 |
| 2002/0150371 A1 * | 10/2002 | Battey et al. ............... 385/135 |

FOREIGN PATENT DOCUMENTS

| JP | 58-105114 | 6/1983 |
| JP | 60-169813 | 9/1985 |
| JP | 60-169815 | 9/1985 |
| JP | 61-27510 | 2/1986 |
| JP | 61-190305 | 8/1986 |
| JP | 61-220536 | 9/1986 |

(Continued)

*Primary Examiner*—Chandrika Prasad
(74) *Attorney, Agent, or Firm*—Christopher C. Dremann

(57) ABSTRACT

An optical connection closure has at least one connector port located within an external wall of the closure for receiving a connectorized optical fiber of a distribution cable on the inside of the closure and a pre-connectorized fiber optic drop cable on the outside of the closure. The closure includes a base, a cover affixed to the base and movable between a closed position and an opened position, and an end wall that defines at least a portion of at least one cable opening for receiving the distribution cable in a butt-type or a through-type closure configuration. The base and the cover define an interior cavity that optionally contains a splice tray for interconnecting the optical fiber of the distribution cable with a pigtail to create the connectorized optical fiber. The connector port may be located within an end wall, a bottom wall or a top wall of the closure.

18 Claims, 10 Drawing Sheets

FOREIGN PATENT DOCUMENTS

| | | |
|---|---|---|
| JP | 62-59906 | 3/1987 |
| JP | 63-136007 | 6/1988 |
| JP | 63-180915 | 7/1988 |
| JP | 63-287916 | 11/1988 |
| JP | 63-310317 | 12/1988 |
| JP | 1-138828 | 5/1989 |

\* cited by examiner

OPTICAL CONNECTION CLOSURE HAVING AT LEAST ONE CONNECTOR PORT

BACKGROUND OF THE INVENTION

1. Field of the Invention

The present invention relates generally to enclosures deployed in fiber optic communications networks, and more specifically, to an optical connection closure having at least one connector port located in an external wall of the closure operable for receiving a connectorized optical fiber on the inside of the closure and a pre-connectorized fiber optic drop cable on the outside of the closure.

2. Description of the Related Art

Optical fiber is increasingly being used for a variety of broadband applications including voice, video and data transmissions. As a result of the ever-increasing demand for broadband communications, fiber optic networks typically include a large number of mid-span access locations at which one or more optical fibers are branched from a distribution cable. These mid-span access locations provide a branch point from the distribution cable leading to an end user, commonly referred to as a subscriber, and thus, may be used to extend an "all optical" communications network closer to the subscriber. In this regard, fiber optic networks are being developed that deliver "fiber-to-the-curb" (FTTC), "fiber-to-the-business" (FTTB), "fiber-to-the-home" (FTTH), or "fiber-to-the-premises" (FTTP), referred to generically as "FTTx." Based on the increase in the number of access points and the unique physical attributes of the optical fibers themselves, enclosures are needed for protecting, handling and maintaining optical fibers. Enclosures are also needed for readily connecting branched optical fibers of the distribution cable with respective optical fibers of drop cables to establish desired optical connections, while at the same time providing protection for the access point, the branched optical fibers and the optical connections from exposure to environmental conditions.

In one example of a fiber optic communications network, one or more drop cables are interconnected with a distribution cable at a mid-span access location within an aerial splice closure suspended from an aerial strand or from the distribution cable itself. Substantial expertise and experience are required to configure the optical connections within the closure in the field. In particular, it is often difficult to enter the closure and to identify an optical fiber of the distribution cable to be interconnected with an optical fiber of a particular drop cable. Once identified, the optical fibers of the drop cables are typically joined directly to the optical fibers of the distribution cable at the mid-span access location using conventional splicing techniques, such as fusion splicing. In other instances, the optical fibers of the drop cables and the optical fibers of the distribution cable are first spliced to a short length of optical fiber having an optical connector mounted upon the other end, referred to in the art as a "pigtail." The pigtails are then routed to opposite sides of a connector adapter sleeve located within the closure to interconnect the drop cable with the distribution cable. In either case, the process of entering and configuring the closure is not only time consuming, but frequently must be accomplished by a highly skilled field technician at significant cost and under field working conditions that are less than ideal. Reconfiguring optical fiber connections in an aerial splice closure is especially difficult, particularly in instances where at least some of the optical fibers of the distribution cable extend uninterrupted through the closure, since the closure cannot be readily removed from the distribution cable. Further, once the optical connections are made, it is often labor intensive, and therefore costly, to reconfigure the existing optical connections or to add additional optical connections.

In order to reduce costs by permitting less experienced and less skilled technicians to perform mid-span access optical connections and reconfigurations in the field, communications service providers are increasingly pre-engineering new fiber optic networks and demanding factory-prepared interconnection solutions, commonly referred to as "plug-and-play" type systems. Pre-engineered networks, however, require that the location of certain of the branch points in the network be predetermined prior to the distribution cable being deployed. More particularly, pre-engineered solutions require precise location of the factory-prepared mid-span access locations where the preterminated, and sometimes pre-connectorized, optical fibers are made available for interconnection with optical fibers of drop cables extending from the subscriber premises. With regard to a factory-prepared interconnection solution, it would be desirable to produce an optical connection closure having one or more connector ports located in an external wall of the closure operable for receiving pre-connectorized optical fibers on the inside of the closure and pre-connectorized fiber optic drop cables on the outside of the closure. It would also be desirable in an FTTP network to provide an optical connection closure that is operable to readily interconnect pre-connectorized fiber optic drop cables with a feeder cable, distribution cable or branch cable of the network. It would also be desirable to provide an optical connection closure within an FTTP network that may be readily reconfigured after installation by a less experienced and less skilled field technician. It would further be desirable to be able to establish optical connections in a fiber optic communications network while eliminating the need for entering the closure and performing splices or adapter sleeve connections after the initial installation.

BRIEF SUMMARY OF THE INVENTION

To achieve the foregoing and other objects, and in accordance with the purpose of the present invention as embodied and broadly described herein, the present invention provides various embodiments of an optical connection closure having one or more connector ports located in an external wall of the closure for receiving connectorized optical fibers on the inside of the closure and pre-connectorized fiber optic drop cables on the outside of the closure. An optical connection closure according to the present invention permits a less experienced and less skilled filed technician to establish desired optical connections in a fiber optic communications network and to reconfigure optical connections after initial installation of the closure at a branch point along the length of a feeder, distribution or branch cable of the network. An optical connection closure according to the present invention also permits optical connections to be established and reconfigured without the need for entering the closure and performing splices or adapter sleeve connections after the initial installation.

In an exemplary embodiment, the present invention provides an optical connection closure for use at a branch point in a fiber optic communications network including a distribution cable comprising a plurality of optical fibers and a mid-span access location provided along the length of the distribution cable. The closure comprises a base, a cover affixed to the base, opposed end walls affixed to the base, one or more distribution cable openings defined by the base and the opposed end walls for receiving the distribution cable extending therethrough, and one or more connector ports provided in the base, the cover or the opposed end walls. The distribution cable openings are operable for receiving the distribution cable between the opposed end walls, and the one or more connector ports are operable for receiving connectorized optical fibers of the distribution cable on the inside of the closure and pre-connectorized drop cables on the outside of the closure. The closure may further comprise a shelf affixed within the base and movable between an opened position and a closed position in order to provide access to the distribution cable and the connectorized optical fibers, and at least one splice tray secured to the shelf for splicing at least one optical fiber of the distribution cable to a respective optical fiber terminating in a pigtail. The closure may be sealed or unsealed (breathable) depending upon the particular network deployment, such as an aerial, pedestal-mounted or below grade deployment.

In another exemplary embodiment, the present invention provides an optical connection closure for use at a branch point in a fiber optic communications network including a distribution cable comprising a plurality of optical fibers and a mid-span access location provided along the length of the distribution cable. The closure comprises a base, opposed end walls retained within the base and inserted around the distribution cable in order to receive the distribution cable between the opposed end walls, a cover removably secured to the base, and one or more connector ports located within an external wall of the cover. As with the embodiment previously described, the one or more connector ports are operable for receiving connectorized optical fibers of the distribution cable on the inside of the closure and pre-connectorized drop cables on the outside of the closure.

In yet another exemplary embodiment, the present invention provides a fiber optic communications network including a distribution cable comprising a plurality of optical fibers, a mid-span access location provided along the length of the distribution cable, an optical connection closure positioned in the fiber optic network around the mid-span access location, the closure comprising one or more connector ports for receiving a connectorized optical fiber of the distribution cable on the inside of the closure and a pre-connectorized drop cable on the outside of the closure, at least one distribution cable opening for receiving the distribution cable extending through the closure, and opposed end walls positioned around the distribution cable and affixed to a base to retain the distribution cable between the opposed end walls of the closure.

BRIEF DESCRIPTION OF THE DRAWINGS

These and other features, aspects and advantages of the present invention are better understood when the following detailed description of the invention is read with reference to the accompanying drawings, wherein:

FIG. 6b is a rear perspective view of the end cap of FIG. 6a;

DETAILED DESCRIPTION OF THE INVENTION

Figure 1:
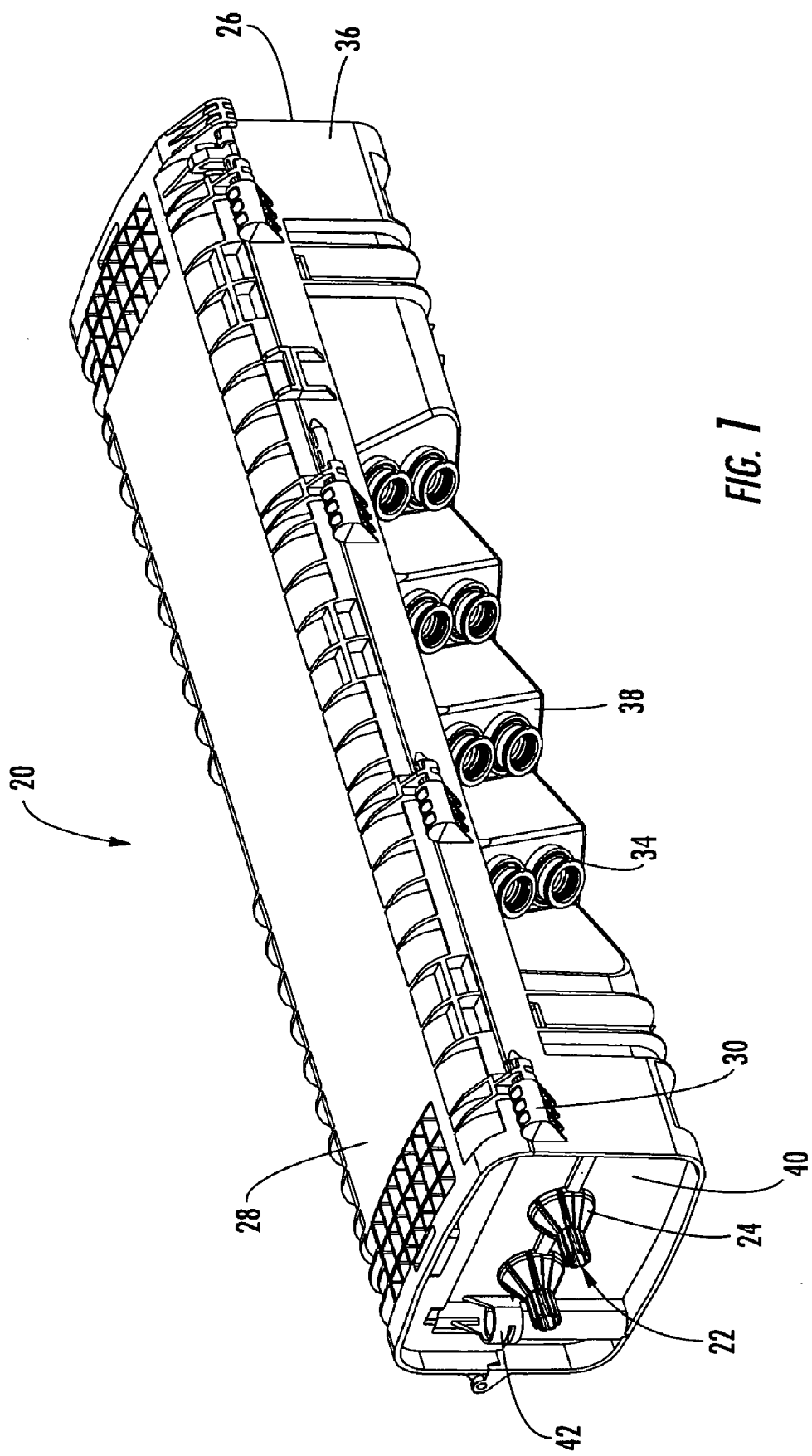
FIG. 1 is a perspective view of an aerial optical connection closure having a plurality of connector ports located within an external wall of the closure in accordance with an exemplary embodiment of the present invention.

The present invention will now be described more fully hereinafter with reference to the accompanying drawings in which exemplary embodiments of the invention are shown. This invention may, however, be embodied in many different forms and should not be construed as limited to the embodiments set forth herein. These exemplary embodiments are shown and described so that this disclosure will be both thorough and complete, and will fully convey the scope of the invention to those skilled in the art. Like reference numbers refer to like elements throughout the various drawings.

The present invention provides various embodiments of an optical connection closure having one or more connector ports located in an external wall of the closure for receiving connectorized optical fibers on the inside of the closure and pre-connectorized fiber optic drop cables on the outside of the closure. Each connector port may include a connector adapter sleeve disposed within the connector port or may be configured to receive the mating optical connectors in any suitable manner now known or hereafter devised. Regardless, each connector port is the location at which an optical connection is made between a connectorized optical fiber of the distribution cable and a respective optical fiber of a pre-connectorized drop cable. In all embodiments envisioned herein, the connector ports are located within an external wall of the closure, such as an end wall of the closure housing, the bottom wall of the closure housing or the top wall of the closure housing. At least one cable opening is also located within at least one external wall of the housing for receiving, and passing therethrough, a distribution cable. In various closure designs, the distribution cable enters and exits the closure at opposing ends of the closure housing (e.g., a "taut-sheath" or "through" type closure). In alternative closure designs, the distribution cable enters and exits the closure at the same end of the closure housing (e.g., a "canister" or "butt" type closure). The location of the cable openings depends on the specific network deployment, such as an aerial, aboveground pedestal or below grade deployment.

In all embodiments envisioned herein, connectorized optical fibers of the distribution cable are routed to the connector ports on the inside of the closure. In certain embodiments, the optical fibers accessed from the distribution cable may be spliced to optical fibers having optical connectors mounted on the other end (i.e., "pigtails"), which are then routed to the connector ports. Other optical fibers of the distribution cable may be stored separately from the accessed optical fibers such that they extend uninterrupted through the optical connection closure. Once the optical fibers are connectorized and routed to the connector ports, the closure may be closed and/or sealed. One or more pre-connectorized drop cables are then routed to the connector ports from the outside of the closure at any time subsequent to the initial installation of the closure without requiring access to the inside of the closure. The size of the closure may vary based upon the diameter of the distribution cable, the amount of optical fiber slack stored within the closure and the number of connector ports located in an external wall of the closure. In all embodiments, different distribution cable types may be accommodated, such as monotube, loose tube, central tube, ribbon and the like. In all embodiments, the optical connection closure may be adapted to accommodate a variety of connector types, such as but not limited to SC, LC, DC, FC, ST, SC/DC, MT-RJ, MTP and MPO ferrules.

In all embodiments, an optical connection closure, referred to herein as the "connection closure" or "closure," according to the present invention comprises one or more cable openings for receiving and routing one or more distribution cables. One example of a distribution cable type that may be used in conjunction with present invention is an ALTOS® dielectric cable available from Corning Cable Systems LLC of Hickory, N.C. The ALTOS® dielectric cable is a lightweight fiber optic cable designed for both conduit (buried) and aerial (lashed) installations. In another example, the distribution cable is a Standard Single-Tube Ribbon (SST-Ribbon™) cable available from Corning Cable Systems LLC of Hickory, N.C. The SST-Ribbon™ cable contains readily identifiable twelve-fiber ribbons in a gel-filled tube. The distribution cable may be of a design that provides stable performance over a wide range of temperatures and is compatible with any telecommunications grade optical fiber. As used herein, the term "optical fiber" is intended to include all types of single mode and multi-mode light waveguides, including one or more bare optical fibers, loose-tube optical fibers, tight-buffered optical fibers, ribbonized optical fibers or any other expedient of a medium for transmitting light signals. In preferred embodiments, the distribution cable is flexible, easy to route and has no preferential bend. The pre-connectorized drop cables may be readily connected to and disconnected from the connector ports of the optical connection closure, thus eliminating the need for entering the closure and splicing the optical fibers of the drop cables to respective optical fibers of the distribution cable.

The distribution cable comprises one or more branch points at access locations provided along the length of the distribution cable. At each access location, one or more optical fibers are identified, severed and branched from the distribution cable, resulting in one or more preterminated optical fibers. In one embodiment, the preterminated optical fibers are direct connectorized (i.e., an optical connector is mounted directly on the end of the preterminated optical fiber). In an alternative embodiment, the preterminated optical fibers are first spliced to a shot length of optical fiber having an optical connector attached at the other end (i.e., a pigtail).

The access locations may be factory-prepared or prepared in the field by a highly skilled field technician. In a factory-prepared access location, a portion of the cable sheath of the distribution cable is removed in the factory to expose a predetermined length of an underlying tubular body, such as a buffer tube, containing a plurality of optical fibers. Preselected optical fibers are then accessed from the tubular body and preterminated from the distribution cable. The access location may then be protected with an installation enclosure, which may be removed after the distribution cable is deployed. In a field-prepared access location, a portion of the cable sheath of the distribution cable is removed in the field by a highly skilled to expose a predetermined length of an underlying tubular body, such as a buffer tube, containing a plurality of optical fibers. Preselected optical fibers are then preterminated and connectorized, as previously described. In both the factory-prepared and field-prepared access locations, the branch point, preterminated optical fibers and optical connectors are enclosed and protected using the optical connection closure of the present invention. In all embodiments, a pre-selected number of optical fibers of the distribution cable are preterminated for interconnection with one or more drop cables, while the remainder of the optical fibers may extend uninterrupted through the connection closure to another access location.

Figure 2:
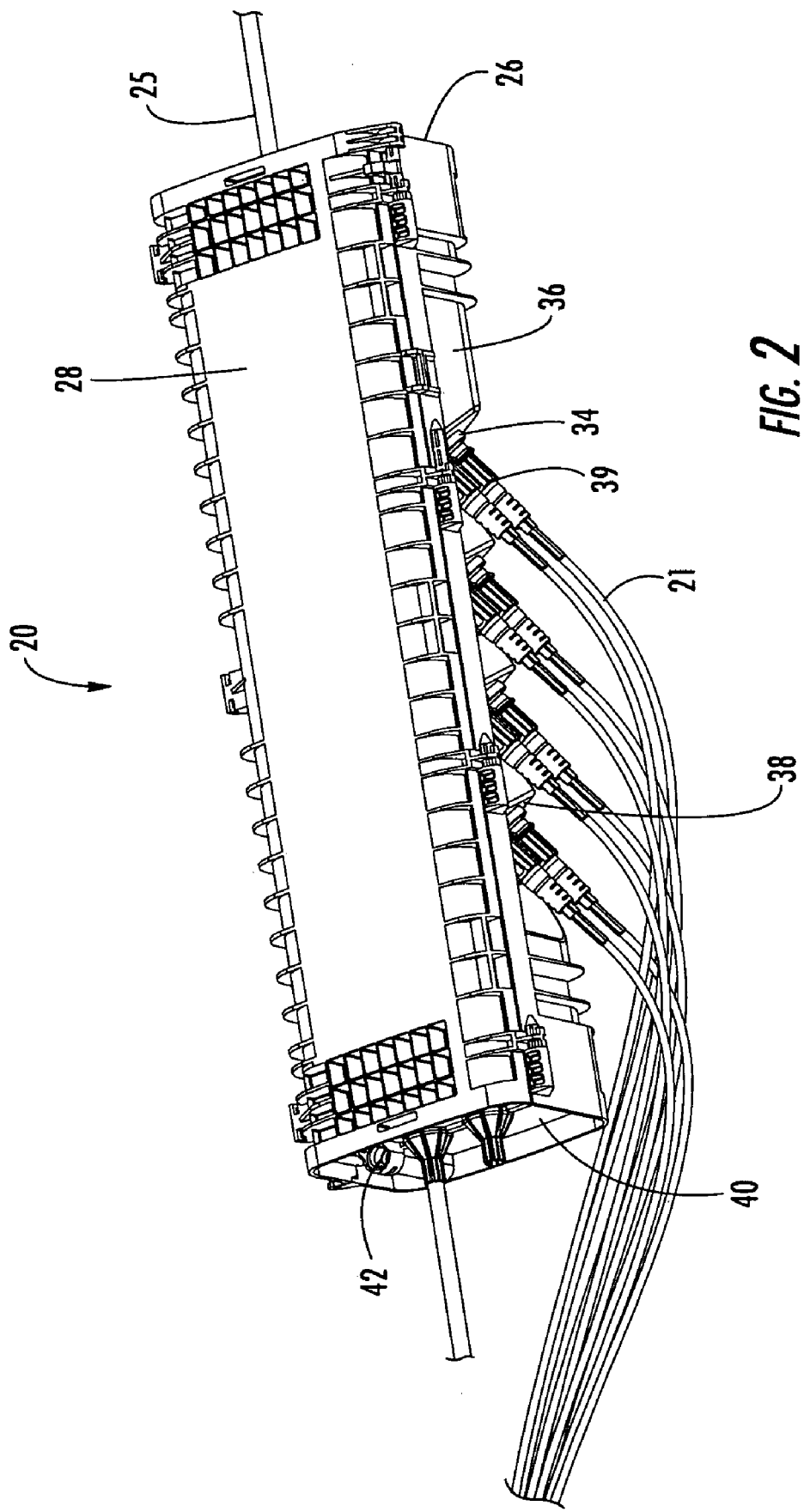
FIG. 2 is a perspective view of the closure of FIG. 1 including a distribution cable extending through the closure and a plurality or pre-connectorized drop cables connected to respective connector ports.
Figure 3:
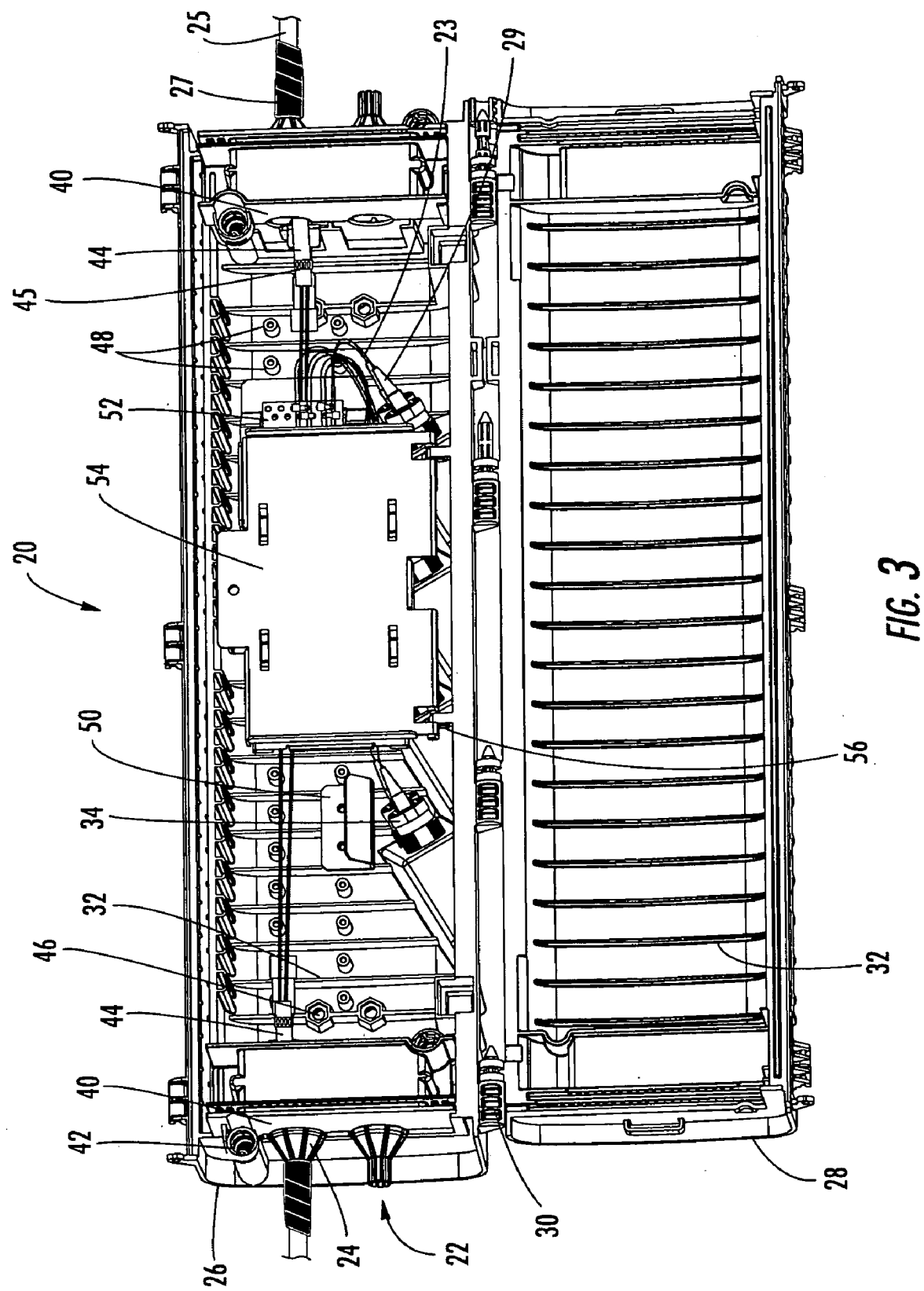
FIG. 3 is a perspective view of the closure of FIG. 2 with the cover in an opened position to show the internal compartment of the closure and the routing of a plurality of connectorized optical fibers of the distribution cable to respective connector ports.

Referring now to FIGS. 1–3, an optical connection closure 20 constructed in accordance with an exemplary embodiment of the present invention is shown. The connection closure 20 permits an optical fiber of one or more pre-connectorized fiber optic drop cables 21 (FIG. 2) to be readily interconnected with a field terminated or factory preterminated and connectorized optical fiber 23 (FIG. 3) of a fiber optic distribution cable 25 (FIG. 2 and FIG. 3). As is well known and understood in the art, each pre-connectorized drop cable 21 comprises a flexible transport tube containing one or more optical fibers connected to an outside plant optical connection terminal, for example, a NID at a subscriber premises. The connection closure 20 provides a convenient branch point in an optical network for a field technician to initially install and subsequently reconfigure optical connections between a distribution cable and a drop cable in the network to provide communications service to a subscriber.

The connection closure 20 shown in FIGS. 1–3 is typically installed in an aerial location, however, the closure 20 may be installed below grade within a hand-hole or vault, or above ground within a larger enclosure, such as a cabinet, network terminal or pedestal. As shown, the connection closure 20 is secured in an aerial location and mounted to the distribution cable 25 by way of one or more cable openings 22 defined by external walls of the closure 20. Each cable opening 22 is adapted for receiving and routing a distribution cable 25 through the connection closure 20. The cable openings 22 are defined by two halves of an end wall 40 that are brought together and secured around the distribution cable 25. Each half of the end wall 40 defines approximately half of each cable opening 22. Offset fasteners 42, such as screws, may be used to secure the two halves of the end wall 40 together around the distribution cable 25. The fasteners 42 may also secure the end wall 40 to the base 26. The fasteners 42 may be accessed when the cover 28 is in an opened position. The base 26 and the end wall 40 may also comprise a water-blocking gel material that provides a sealing function between the distribution cable 25 and the respective cable opening 22 in a known manner.

Although the connection closure 20 shown herein is a "taut-sheath" or "through" type closure, it may have other configurations, such as a "canister" or "butt" type closure, without departing from the intended scope of the present invention. In the case of a through type closure, cable openings 22 may be utilized at opposed end walls of the connection closure 20, thus providing a lengthwise-extending passage through the closure 20. In the case of a butt type closure, two different cable openings 22 may be utilized at one end wall, thus providing cable entrance and exit openings in the same end wall. The cable openings 22 may be occupied with sealing members 24 and heat shrink material 27 operable for ensuring a watertight seal between the distribution cable 25 outside the connection closure 20 and inside the closure 20. Unoccupied cable openings 22 may be fitted with a plug (not shown), cap or other sealing members necessary until needed.

The connection closure 20 comprises a base 26 and a cover 28 each made of a lightweight, yet rigid material, such as aluminum, plastic or thermoplastic. Referring to FIG. 3, if necessary, the base 26 and cover 28 may be provided with lengthwise and/or widthwise stiffening ribs 32 to strengthen and prevent distortion of the base 26 and cover 28. The base 26 is generally box-shaped and defines an interior cavity for housing the express portion of distribution cable 25, connectorized optical fibers 23 and optical hardware, such as splice trays, couplers, adapters, optical fiber routing and slack storage guides and the like. The base 26 may have any of a variety of shapes that is suitable for housing optical communications hardware and for routing the express portion of distribution cable 25 and one or more connectorized optical fibers 23 of fiber optic distribution cable 25. The base 26 of the embodiments illustrated herein is generally elongated in the lengthwise dimension relative to the lateral dimension between a pair of opposed end walls 40. Preferably, the cover 28 is hingedly affixed to the base 26 and adapted to be opened and closed thereon. As shown, the cover 28 is generally rectangular and is hingedly affixed to the base 26 at one or more hinge locations 30. However, the cover 28 may be slidably attached to the base 26 to selectively expose the interior cavity of the base 26. Alternatively, the cover 28 may be removably attached to the base 26 to provide unobstructed access to the interior cavity. The base 26 and/or the cover 28 is preferably provided with clasps (not shown) or other conventional fasteners for securing the cover 28 to the base 26 in the closed configuration. A sealing gasket (not shown) may also be disposed between the base 26 and the cover 28 to provide a seal against environmental elements such as wind-driven rain.

The exemplary embodiment illustrated in FIGS. 1–3 comprises eight connector ports 34 for connecting between one and eight pre-connectorized drop cables 21 to connectorized optical fibers 23 of the distribution cable 25. Although eight connector ports 34 are shown in this particular embodiment, it is envisioned that the connection closure 20 may be designed to accommodate one or more connector ports 34. Thus, it is conceivable that the connection closure 20 may accommodate any number of pre-connectorized drop cables 21, for example, one, two, three, four, six, eight, twelve, etc. As used herein, the term "connector port" is intended to include an opening through an external wall of the connection closure 20 at which a connector of a connectorized optical fiber 23 of the distribution cable 25 is optically connected to a connector of a pre-connectorized drop cable 21. The connector port 34 may also include a factory-installed connector adapter sleeve (not shown) for aligning and maintaining the mating connectors in physical contact. In one embodiment, the connector adapter sleeve may be biased within the adapter to ensure physical contact between the opposed end faces of the connectors. Preferably, the connector ports 34 further provide an environmental seal at the interface between the connectorized optical fiber 23 of the distribution cable 25 and the pre-connectorized drop cable 21. Unused connector ports 34 may be covered and sealed with a removable cap or plug (not shown) until the connector port 34 is needed.

Referring specifically to FIGS. 1 and 2, eight connector ports 34 are shown disposed within a sidewall 36 of the base 26. The eight connector ports 34 are arranged into four pairs of two connector ports 34 each positioned on angled surfaces 38 defined by the base 26. The connector ports 34 are angled such that the pre-connectorized drop cables 21 may be directed towards one end of the connection closure 20, thus providing a low profile assembly and improved access to install, remove and reconfigure the optical connections. In addition, the pre-connectorized drop cables 21 are typically installed so as to provide a drip loop in a known manner to direct moisture away from the optical connections. In aerial applications, the connection closure 20 may be mounted upon the distribution cable 25 with the connector ports 34 directed towards the location where the other end of the drop cables 21 will be installed, for example, a subscriber premises. In addition to being angled, the angled surfaces 38 comprising the connector ports 34 are recessed from the sidewall 36 of the connection closure 20, thus protecting the connector ports 34 and the connectorized ends 39 of the drop cables 21 from direct impact in the even that the closure 20 is dropped or struck along the sidewall 36. In preferred embodiments, each angled surface 38 comprises one or two connector ports 34 to minimize the depth dimension of the connection closure 20. However, the size of the connection closure 20 may vary depending on the number and arrangement of the connector ports 34 required for a particular deployment.

Referring specifically to FIG. 3, a connection closure 20 constructed in accordance with a particular embodiment of the present invention is illustrated with the cover 28 opened to show the interior of the closure 20 and its contents. The distribution cable 25 is shown entering the connection closure 20 through a cable opening 22 located within one end wall 40, and exiting the closure 20 via another cable opening 22 located within the opposed end wall 40. Inside the connection closure 20, the distribution cable 25 is secured to a cable bracket 44 positioned adjacent to the appropriate cable opening 22 located within each end wall 40. The cable bracket 44 defines a notch along its length for securing a conventional cable tie, strap or hose clamp 45 around the distribution cable 25 in a known manner. The cable bracket 44 also aids in retaining the connection closure 20 in place in a desired position along the length of the distribution cable 25. A plurality of mounting features 46 may be located on a wall of the connection closure 20 for attaching mounting brackets, for example, aerial hanging brackets, to the external surface of the closure 20. A plurality of hardware mounting features 48 are located on an interior wall of the connection closure 20 for fastening optical hardware, such as optical fiber storage trays, splice trays, coupler trays, routing guides, fiber organizers, etc., to the interior of the connection closure 20. A slack basket 50 may be fastened to the hardware mounting features 48 and operable for receiving and storing slack lengths of optical fibers and/or optical fiber buffer tubes. A strain relief bracket 52 may also be secured to the interior of the connection closure 20 using the hardware mounting features 48. Alternatively, the strain relief bracket 52 may be provided as part of a splice tray or other optical communications hardware. The strain relief bracket 52 provides strain relief for the optical fibers 23 exiting, for example, a splice tray (obscured). Splice trays are used when terminated or preterminated optical fibers are spliced in the field, such as when one or more optical fibers of the distribution cable 25 are accessed in the field to create a mid-span access location and spliced to interconnect the distribution cable with one or more drop cables 21. As shown, a plurality of optical fibers of the distribution cable 25 are spliced to optical fibers having an optical connector 29 mounted thereon (i.e., a pigtail) to produce a corresponding plurality of connectorized optical fibers 23.

The connectors 29 of the connectorized optical fibers 23 are routed within the interior cavity of the connection closure 20 and connected to the connector ports 34 on the inside of the closure 20. With the cover 28 opened as shown, the interior of the connection closure 20 is readily accessible to a field technician initially installing the connectorized optical fibers 23 into the respective connector port 34. The field technician may create and route additional connectorized optical fibers 23 to unused connector ports 34, or remove or rearrange optical connections between existing connectorized optical fibers 23 and the connector ports 34. Once the connection closure 20 is initially installed, the field technician may also add, remove or rearrange optical connections between optical fibers of the drop cables 21 and the respective connector ports 34 from the exterior of the connection closure 20 without the need for entering the closure 20. Since the connection closure 20 does not have to be entered to connect, disconnect or reconfigure drop cables 21, additional drop cables can be connected without disturbing the previously installed drop cables 21 or the contents of the connection closure 20, particularly the relatively delicate connectorized optical fibers 23 and the splice connections between the optical fibers of the distribution cable 25 and the connectorized optical fibers 23.

In applications in which optical fibers of the distribution cable 25 are spliced to pigtails in the field, a conventional splice organizer or splice tray (obscured) is mounted to a work shelf 54, preferably on the side of the shelf 54 facing the base 26. It will be readily apparent and well understood by one of ordinary skill in the art that inside the splice tray, each optical fiber of the distribution cable 25 is spliced to a pigtail (i.e., connectorized optical fiber 23) in any known manner, such as by fusion or mechanical splicing. The pigtail 23 exits the splice tray and is routed through the strain relief bracket 52 to a connector port 34 located within an external wall of the connection closure 20. The splice tray is adapted to receive any number of splices. The pigtails 23 may exit the splice tray at either end of the shelf 54, and the strain relief bracket 52 may be fastened to an interior wall of the base 26 at either end of the shelf 54. More than one splice organizer or splice tray may be provided to accommodate splicing the optical fibers of the distribution cable 25 to pigtails 23. In the case of more than one splice tray, the splice trays may be positioned in a stacked relationship on the shelf 54 and retained in a known manner, such as by a strap or by a nut secured on a threaded mounting post.

Preferably, the shelf 54 is hingedly affixed to an interior wall of the base 26 of the connection closure 20 at one or more hinge locations 56, thus allowing the shelf 54 to be rotated between an opened position for providing access to the splice tray and a closed position for storing the splice tray. The shelf 54 is movable relative to the base 26 to expose the splice tray to the field technician initially installing the connection closure 20 to performing the necessary splices in the field. Preferably, the distribution cable 25 is routed through the interior of the connection closure 20 beneath the shelf 54 so as to not interfere with the movement of the shelf 54 between the opened and closed positions. As shown, by locating the hinge points 56 adjacent the lower edge of the base 26, the shelf 54 is rotatable relative to the base 26 through an angle of at least about 90 degrees and as much as about 180 degrees between the opened position and the closed position, thus providing full and convenient access to the splice tray. As shown, the hinge locations 56 are located on the same side of the closure 20 as the hinge locations 30 that hingedly affix the cover 26 to the base 28. However, the hinge locations 56 may be located on the side of the closure 20 opposite the hinge locations 30. Alternatively, the shelf 54 may be slidably attached to the base 26 to selectively expose portions of the interior cavity of the base 26, or may be removably attached to the base 26 to provide unobstructed access to the interior cavity. In addition, the base 26 and/or the shelf 54 may be provided with conventional means for retaining the shelf 54 in the opened position such that the shelf 54 provides a stable work platform.

Regardless, sufficient space is provided in the interior cavity of the base 26 to route the optical fibers of the distribution cable 25, the connectorized optical fibers 23 and their respective connectors 29, as well as the express portion of the distribution cable 25 through the interior cavity. In applications in which the distribution cable 25 is accessed and the mid-span access location is factory-prepared, a splice tray may not be needed for connecting the connectorized optical fibers 23 to the respective optical fibers of the distribution cable 25 (e.g., a pre-connectorized fiber optic distribution cable). In this type of application, the shelf 54 and splice tray may be removed and instead a splice organizer may be secured to an interior wall of the connection closure 20 by way of the hardware mounting features 48 to support the factory-prepared splices between the optical fibers of the distribution cable 25 and the connectorized optical fibers 23. Furthermore, similar optical hardware may be provided for supporting the connectors 29 of any connectorized optical fibers 23 that are not routed to a connector port 34, such as a spare optical fiber 23.

Figure 4:
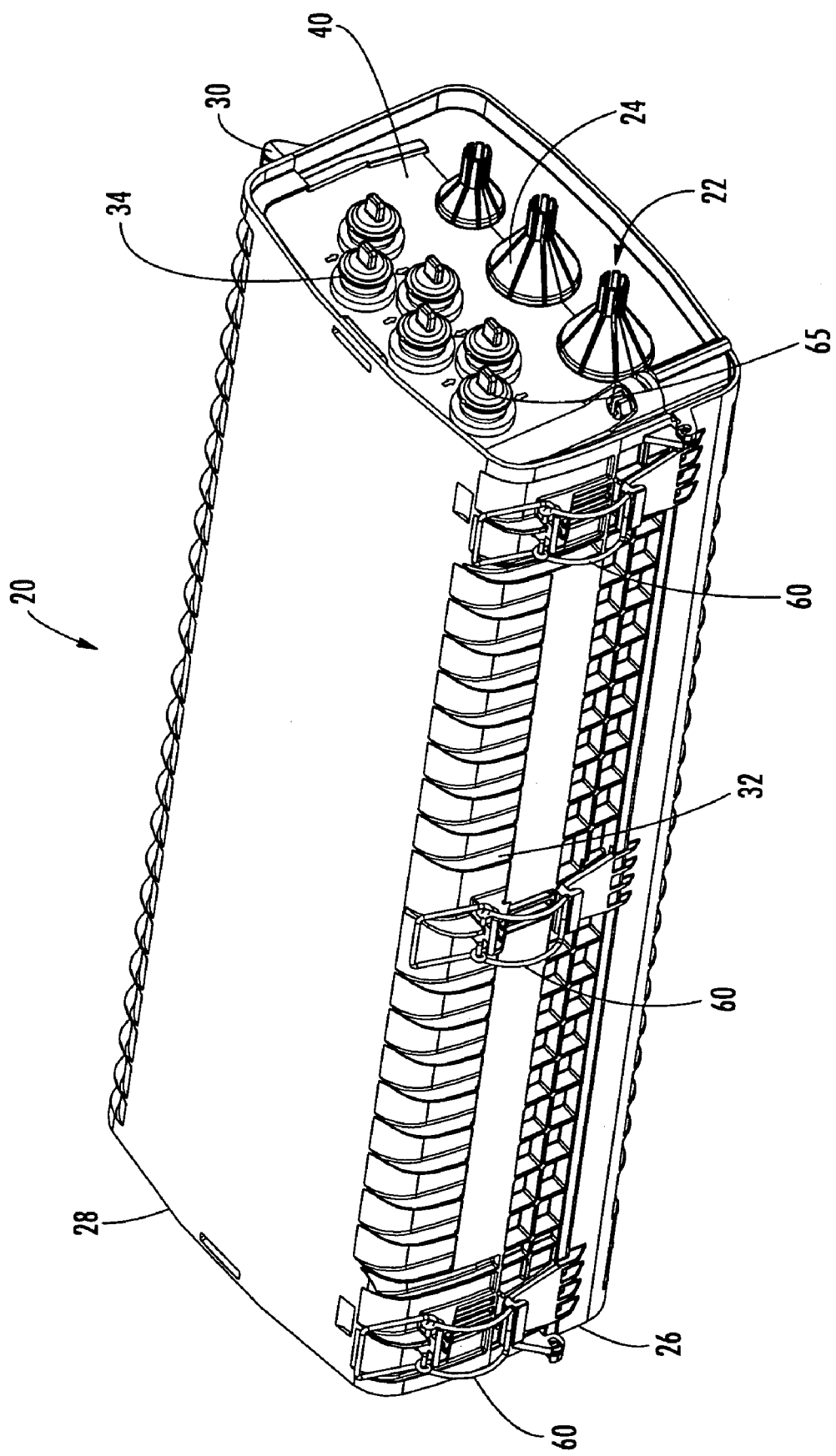
FIG. 4 is a perspective view of an alternative embodiment of an optical connection closure having a plurality of connector ports located within an end wall of the closure in accordance with another exemplary embodiment of the present invention.
Figure 5:
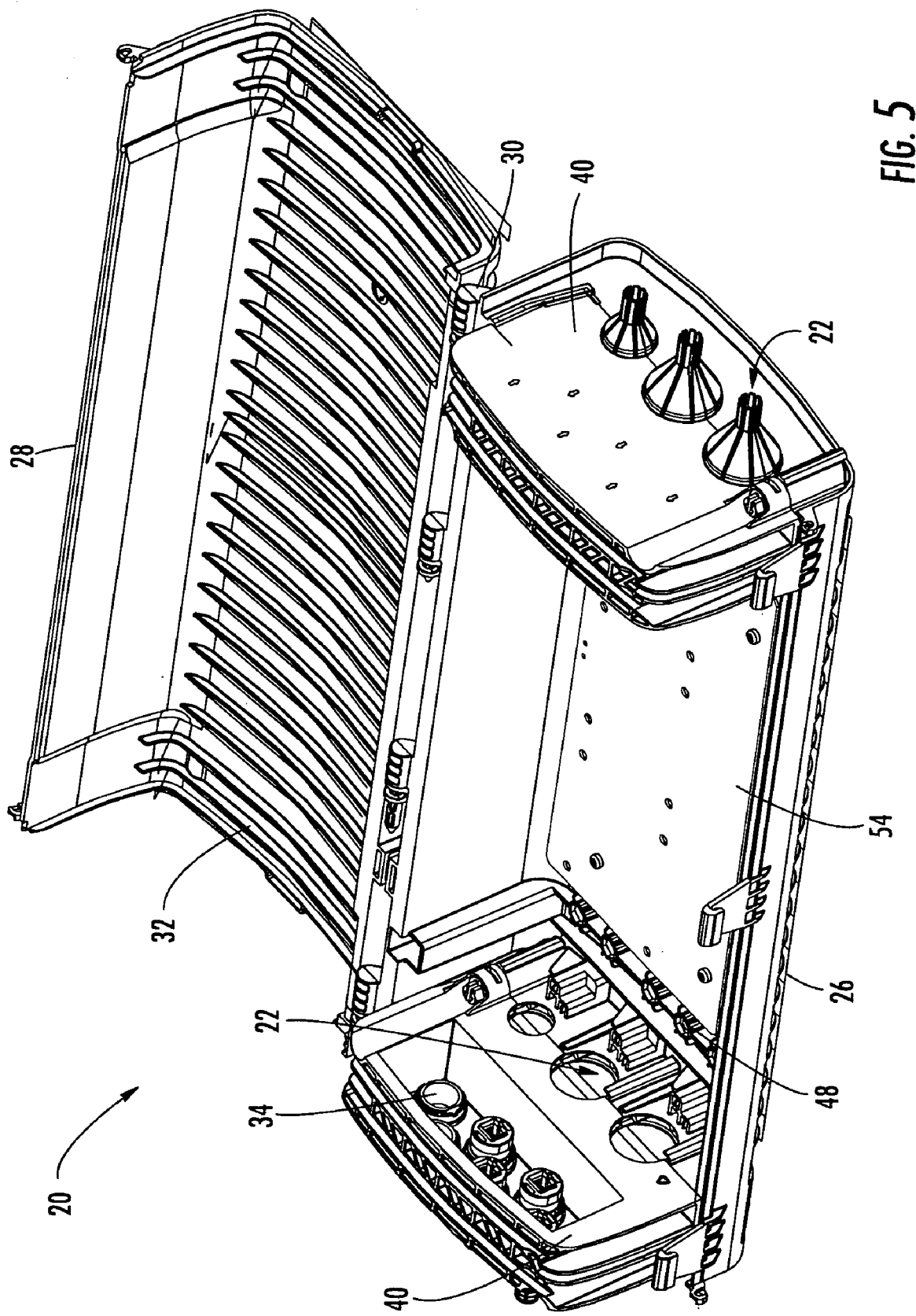
FIG. 5 is a perspective view of the closure of FIG. 4 with the cover in an opened position to show the internal compartment of the closure.

Referring now to FIGS. 4 and 5, a connection closure 20 constructed in accordance with another exemplary embodiment of the present invention is shown. As with the embodiment described above, the connection closure 20 illustrated in FIGS. 4 and 5 is typically mounted in an aerial location on a distribution cable via the cable openings 22 located in end walls 40 of base 26. The cable openings 22 located in the end walls 40 typically receive at least one fiber optic distribution cable (not shown) that extends through the connection closure 20. As shown, six connector ports 34 are located within an end wall 40 of the connection closure 20 for receiving up to six pre-connectorized drop cables (not shown). The distribution cable may enter and exit the connection closure 20 at the same end wall 40 or at opposed end walls 40, thus resulting in a butt-type or through-type enclosure, respectively. As previously mentioned, the connection closure 20 shown in FIGS. 4 and 5 is typically installed in an aerial location, however, the closure 20 may be installed below grade within a hand-hole or vault, or above ground within a larger enclosure, such as a cabinet, network terminal or pedestal.

Figure 6B:
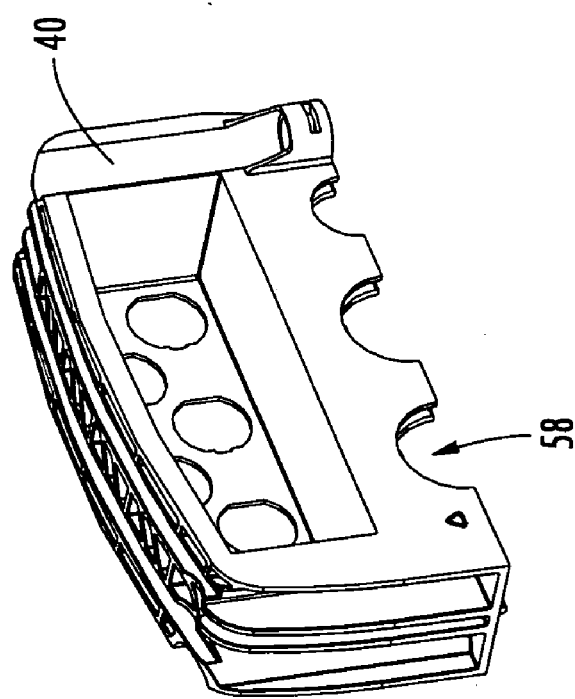
Figure 6A:
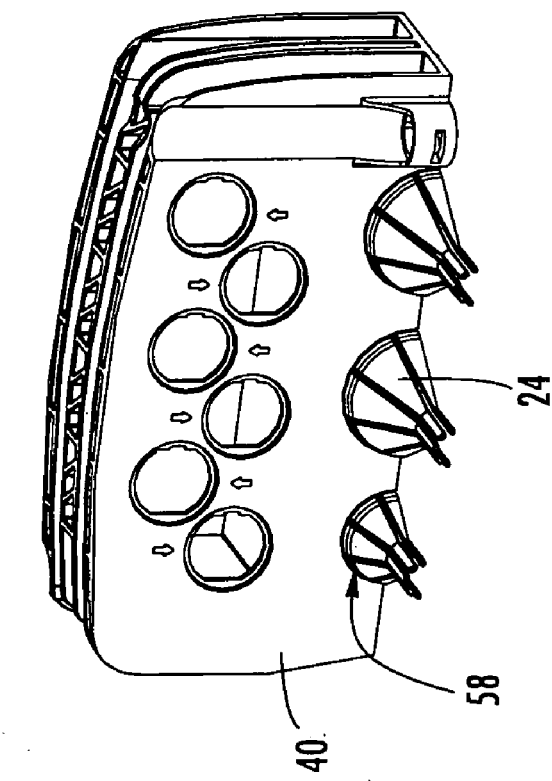
FIG. 6a is a front perspective view of an exemplary embodiment of an end cap for the closure of FIG. 5 having a plurality of connector ports and distribution cable openings located within the end cap.

The end wall 40 of the connection closure 20 has a pair of larger diameter circular cable openings 22 and a smaller diameter cable opening 22 formed therein. At least one distribution cable is received in any one of the three cable openings 22. Two-piece sealing members 24 engage the end wall 40 and the distribution cable such that the distribution cable is retained in a sealed manner through the end wall 40. If only one distribution cable is received through the end wall 40, the empty cable openings 22 may be fitted with a cap or plug (not shown) so that the connection closure 20 remains watertight. Referring specifically to FIGS. 6a and 6b, each cable opening 22 is formed in part by the end wall 40 and in part by an end portion of the base 26, with each part defining a semi-circular recess 58 for engaging approximately half of the distribution cable. To mount the connection closure 20 on a distribution cable, the field technician installs the closure 20 around the distribution cable and within the semi-circular recesses 58 defined by the base 26. The end wall 40 is then installed over the distribution cable and secured to the base 26 using the fasteners 42, such one or more threaded screws or bolts. As with the embodiment shown in FIGS. 1–3, the end wall 40 defines offset openings for receiving fasteners 42, which may be accessed when the cover 28 is in an opened position.

Preferably, the base 26, cover 28 and end wall 40 are each made of a lightweight, yet rigid material, such as aluminum, plastic or thermoplastic. Referring to FIGS. 4 and 5, if necessary, the base 26 and cover 28 may be provided with lengthwise and/or widthwise stiffening ribs 32 to strengthen and prevent distortion of the base 26 and cover 28. The base 26 is generally box-shaped and defines an interior cavity for housing the express portion of the distribution cable, the connectorized optical fibers and optical hardware, such as splice trays, couplers, adapters, optical fiber routing and slack storage guides and the like. The base 26 may have any of a variety of shapes that is suitable for housing optical communications hardware and for routing the express portion of distribution cable and one or more connectorized optical fibers of the fiber optic distribution cable, as previously described. Preferably, the cover 28 is hingedly affixed to the base 26 and adapted to be opened and closed thereon. As shown, the cover 28 is generally rectangular and is hingedly affixed to the base 26 along the upper edge of one of the sidewalls at one or more hinge locations 30. However, the cover 28 may be slidably attached to the base 26 to selectively expose the interior cavity of the base 26. Alternatively, the cover 28 may be removably attached to the base 26 to provide unobstructed access to the interior cavity. The base 26 and/or the cover 28 is preferably provided with clasps (not shown) or other conventional fasteners for securing the cover 28 to the base 26 in the closed configuration. A sealing gasket (not shown) may also be disposed between the base 26 and the cover 28 to provide a seal against environmental elements such as wind-driven rain.

As shown, the end wall 40 comprises six connector ports 34 for connecting up to six pre-connectorized drop cables to connectorized optical fibers of the distribution cable. Although six connector ports 34 are shown in this particular embodiment, it is envisioned that the connection closure 20 may be designed to accommodate one or more connector ports 34. Thus, it is conceivable that the connection closure 20 may accommodate any number of pre-connectorized drop cables 21, for example, one, two, three, four, six, eight, twelve, etc. Although not shown, identifying indicia may be placed adjacent to each connector port 34 for easy identification in the field. The connector port 34 may also include a factory-installed connector adapter sleeve (not shown) for aligning and maintaining the mating connectors in physical contact. In one embodiment, the connector adapter sleeve may be biased within the adapter to ensure physical contact between the opposed end faces of the connectors. Preferably, the connector ports 34 further provide an environmental seal at the interface between the connectorized optical fibers of the distribution cable and the pre-connectorized drop cables. Unused connector ports 34 may be covered and sealed with a removable cap or plug 65 until the connector port 34 is needed.

As best shown in FIG. 4 and FIG. 6a, the six connector ports 34 are disposed within the end wall 40 in a staggered configuration. The connector ports 34 are recessed from the lengthwise edges of the base 26 and the cover 28 to protect the connectors ports 34, and any adapter and/or connector disposed therein from environmental factors and external forces, for example, if the connection closure 20 is inadvertently dropped during installation. The longitudinal axes of the connector ports 34 are directed parallel to the longitudinal axes of the distribution cable, thus providing a low profile assembly. The overall dimensions of the connection closure 20 may vary based on the number of connector ports 34 needed for as particular deployment and/or installation.

Referring specifically to FIG. 5, the connection closure 20 is illustrated with the cover 28 opened to show the interior of the closure 20 and its contents. Although not shown, the distribution cable may be secured to one or more cable brackets positioned adjacent to the appropriate cable opening 22 and secured by the base 26 or end wall 40. The cable bracket may define a notch along its length for securing a conventional cable tie, strap, hose clamp or other fastening mechanism around the distribution cable in a known manner. The cable bracket also aids in retaining the connection closure 20 in place in a desired position along the length of the distribution cable. A plurality of hardware mounting features 48 may be located on the interior of the connection closure 20 for fastening optical hardware, such as optical fiber storage trays, splice trays, coupler trays, routing guides, fiber organizers, etc., to the interior of the connection closure 20. A plurality of mounting features (not shown) may be located on the exterior of the connection closure 20 for attaching mounting brackets, for example, aerial hanging brackets or pedestal brackets, to the external surface of the connection closure 20. A slack basket (not shown) may be fastened to the hardware mounting features 48 and operable for receiving and storing slack lengths of optical fibers and/or optical fiber buffer tubes. A strain relief bracket (not shown) may also be secured to the interior of the connection closure 20 using the hardware mounting features 48. The strain relief bracket (which may also be part of a splice tray) provides strain relief for the optical fibers entering and exiting, for example, a splice tray (not shown). Splice trays are used when terminated or preterminated optical fibers are spliced in the field, such as when one or more optical fibers of the distribution cable are accessed in the field to create a mid-span access location and spliced to interconnect the distribution cable with one or more drop cables.

The connectors (not shown) of the connectorized optical fibers are routed within the interior cavity of the connection closure 20 and connected to the connector ports 34 on the inside of the closure 20. Although not shown, strain relief devices may be provided for any of the optical fibers within the interior of the base 26 to strain relieve the optical fibers adjacent the distribution cable or, for example, a splice tray. With the cover 28 opened as shown in FIG. 5, the interior of the connection closure 20 is readily accessible to a field technician initially installing the connectorized optical fibers into the respective connector port 34. The field technician may create and route additional connectorized optical fibers to unused connector ports 34, or remove or rearrange optical connections between existing connectorized optical fibers and the connector ports 34. Once the connection closure 20 is initially installed, the field technician may also add, remove or rearrange optical connections between optical fibers of the drop cables and the respective connector ports 34 from the exterior of the connection closure 20 without the need for entering the closure 20. Since the connection closure 20 does not have to be entered to connect, disconnect or reconfigure drop cables, additional drop cables can be connected without disturbing the previously installed drop cables or the contents of the connection closure 20, particularly the relatively delicate connectorized optical fibers and the splice connections between the optical fibers of the distribution cable and the connectorized optical fibers.

As previously described, a shelf 54 may be used to mount a conventional splice organizer or splice tray within the interior of the connection closure 20 to splice terminated or preterminated optical fibers of the distribution cable to pigtails. The splice organizer or splice tray may be mounted to either the top or bottom surface of the shelf 54. It will be readily apparent and well understood by one of ordinary skill in the art that each terminated or preterminated optical fiber may be spliced to a pigtail in any known manner, such as by fusion or mechanical splicing. The pigtail exits the splice organizer or splice tray and is routed to a connector port 34 located within an external wall of the connection closure 20. The splice organizer or splice tray may be configured to contain any number of splices. Preferably, the pigtails exit the splice organizer or splice tray at the side closest to the connector ports 34. More than one splice organizer or splice tray may be provided to accommodate splicing the optical fibers of the distribution cable to pigtails. In the case of more than one splice tray, the splice trays may be positioned in a stacked relationship on the shelf 54 and retained in a known manner, such as by a strap or by a nut secured on a threaded mounting post. Preferably, the shelf 54 is hingedly affixed to an interior wall of the base 26 of the connection closure 20 at one or more hinge locations, thus allowing the shelf 54 to be rotated between an opened position for providing access to the splice tray and a closed position for storing the splice tray.

Figure 7:
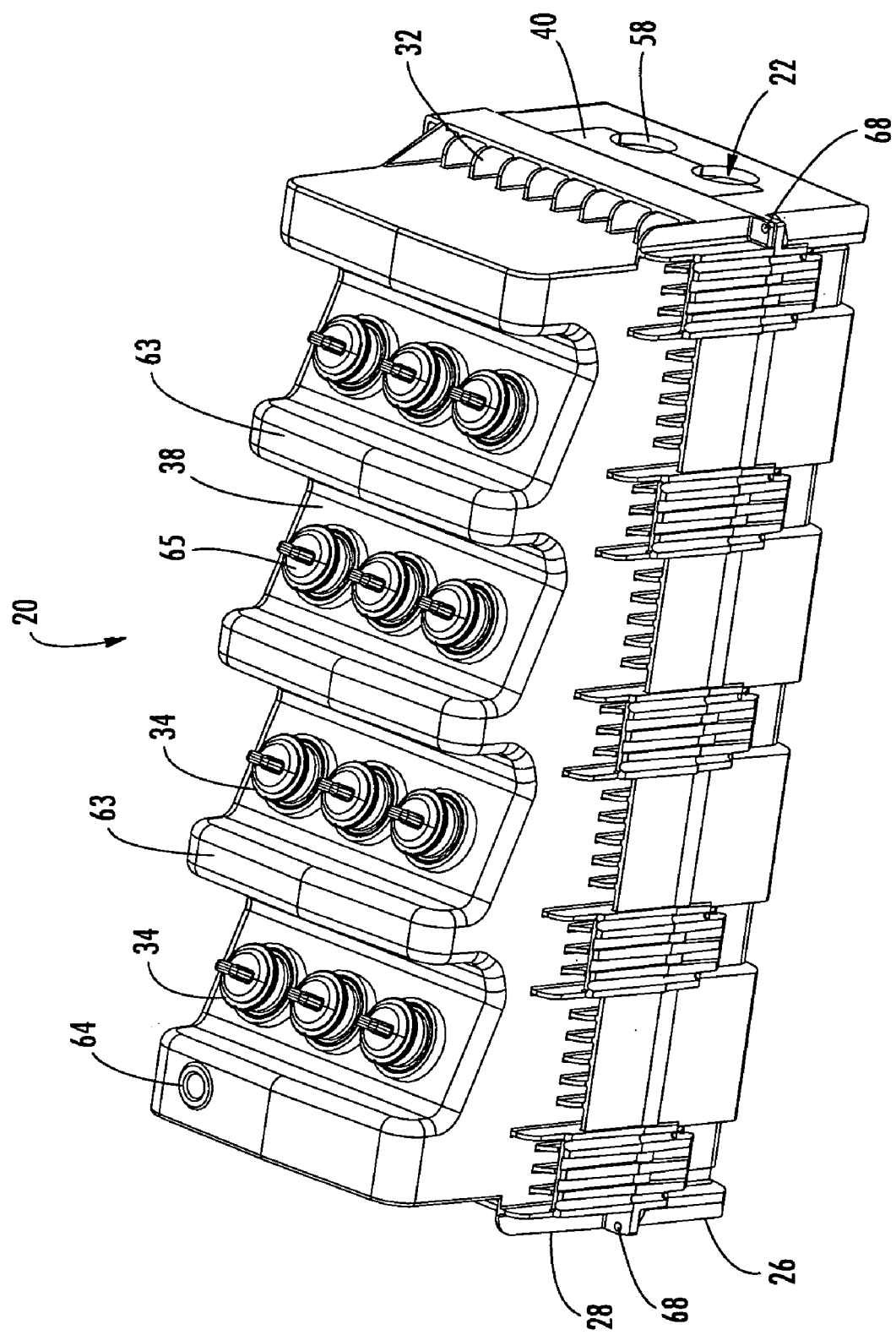
FIG. 7 is a perspective view of a below grade optical connection closure having a plurality of connector ports located within a top wall of the closure in accordance with another exemplary embodiment of the present invention.
Figure 8:
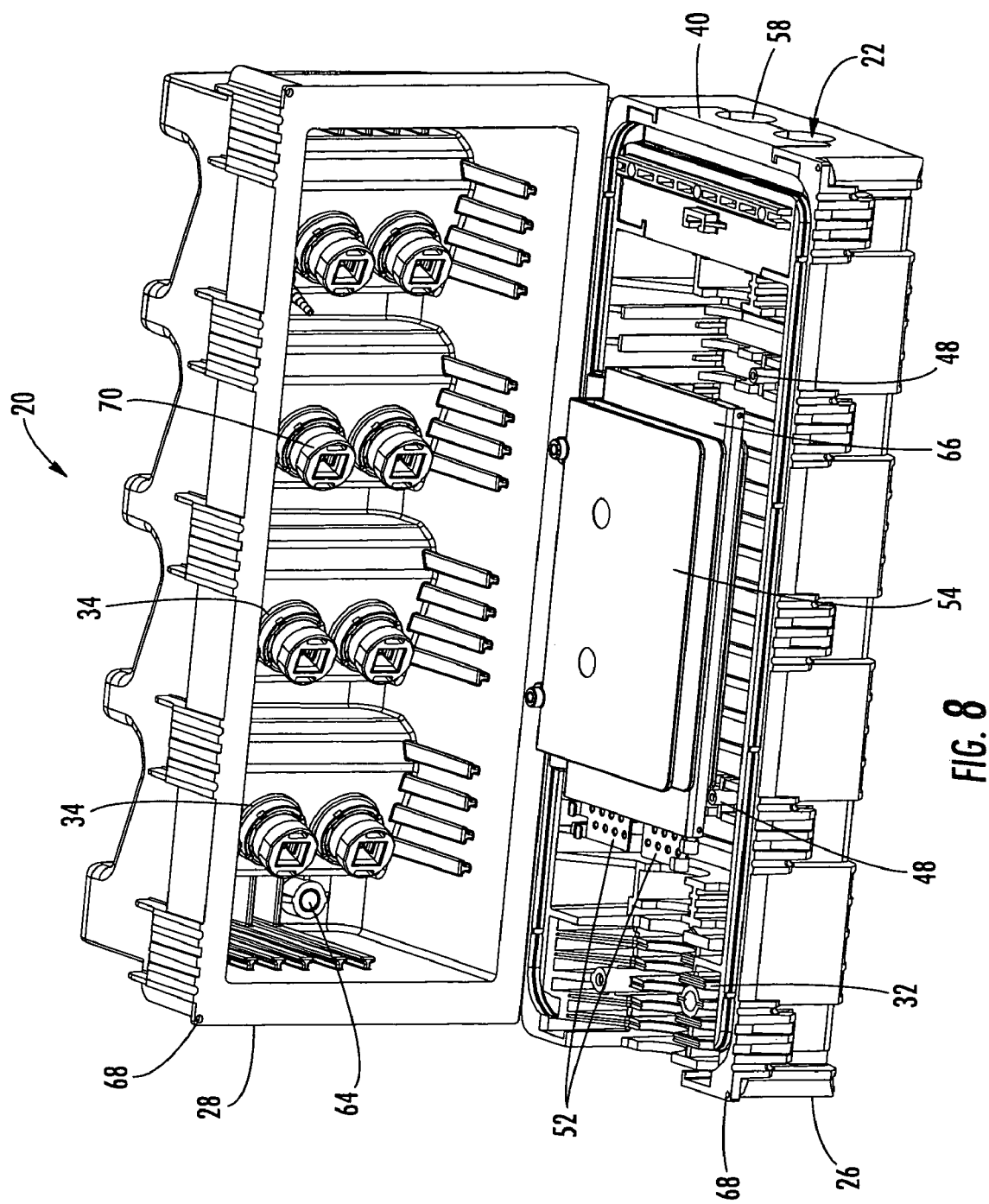
FIG. 8 is a perspective view of the closure of FIG. 7 with the cover in an opened position to show the internal compartment of the closure.

Referring now to FIGS. 7 and 8, a connection closure 20 constructed in accordance with another exemplary embodiment of the present invention is shown. FIG. 7 shows the cover 28 in a closed position, while FIG. 8 shows the cover 28 in an opened position. The embodiment of the connection closure 20 shown in FIGS. 7 and 8 is typically installed in a below grade location, for example, within a hand-hole or vault. However, the connection closure 20 may also be installed in an aerial location, for example on a telephone pole, or in an above ground location within a larger enclosure, such as an above ground cabinet, network terminal or pedestal. For below grade deployments, the connection closure 20 is mounted on a buried distribution cable (not shown) by way of one or more cable openings 22 located within at least one external wall of the connection closure 20. As previously described, the base 26 and the end wall 40 may each define semi-circular recesses 58 that are configured to receive at least one distribution cable through the exterior wall of the connection closure 20. As shown, the end wall 40 is inserted into grooves defined by the base 26 and secured in place around the distribution cable. Fasteners (not shown), such as threaded screws or bolts, may be used to secure the end wall 40 to the base 26. Preferably, the fasteners may only be accessed when the cover 28 is in an opened position. The base 26 and the end wall 40 may also be provided with a water-blocking gel material that provides a sealing function.

The connection closure 20 shown in FIGS. 7 and 8 may be a butt-type or a through-type enclosure, depending on the routing of the distribution cable(s). In the case of a through-type enclosure, cable openings 22 may be utilized at opposed end walls of the connection closure 20, thus providing a lengthwise-extending passage through the closure 20. In the case of a butt-type enclosure, two cable openings 22 may be utilized at one end wall 40, thus providing cable entrance and exit openings in the same end wall 40. The cable openings 22 may be provided with sealing members (not shown) operable for forming a seal between the distribution cable and the connection closure 20. Unoccupied cable openings 22 may be fitted with a plug, cap or other sealing member (not shown) until needed.

The connection closure 20 comprises a base 26 and a cover 28 each made of a lightweight, yet rigid material, such as aluminum, plastic or thermoplastic. The base 26 and cover 28 may be provided with lengthwise and/or widthwise stiffening ribs 32 on either the interior or exterior, or both, of the closure 20 to strengthen and prevent distortion of the base 26 and cover 28. The base 26 is generally box-shaped and defines an interior cavity for housing the express portion of the distribution cable, the connectorized optical fibers and optical hardware, such as splice trays, couplers, adapters, optical fiber routing and slack storage guides and the like. The base 26 may have any of a variety of shapes that is suitable for housing optical communications hardware and for routing the express portion of distribution cable and one or more connectorized optical fibers of the fiber optic distribution cable, as previously described. Preferably, the cover 28 is hingedly affixed to the base 26 and adapted to be opened and closed thereon. As shown, the cover 28 is generally rectangular and is hingedly affixed to the base 26 along the upper edge of one of the sidewalls at one or more hinge locations and secured to the base 26 at openings 68 that receive threaded screws or bolts, or other known fasteners to secure the cover 28 in the closed position. However, the cover 28 may be slidably attached to the base 26 to selectively expose the interior cavity of the base 26. Alternatively, the cover 28 may be removably attached to the base 26 to provide unobstructed access to the interior cavity. A sealing gasket (not shown) may also be disposed between the base 26 and the cover 28 to provide a seal against environmental elements such as wind-driven rain. The connection closure 20 may further comprise a pressure valve 64 operable for pressurizing the interior cavity of the closure 20. While breathable closures may be used in both aerial, buried and above ground deployments, below grade deployments oftentimes require a sealed and pressurized closure 20.

The exemplary embodiment of the closure 20 illustrated in FIGS. 7 and 8 comprises twelve connector ports 34 for receiving up to twelve connectorized optical fibers on the inside of the closure 20 and up to twelve pre-connectorized drop cables on the outside of the closure 20. Although the twelve connector ports 34 are shown arranged in four rows of three, it is envisioned that the connection closure 20 may be designed to accommodate any desired number of connector ports 34, for example, one, two, three, four, six, eight, twelve, etc. Thus, it is conceivable that the closure 20 may accommodate any desired number of pre-connectorized drop cables. Furthermore, the dimensions and overall size of the connection closure 20 will vary depending on the number of connector ports 34 utilized. Although not shown, identifying indicia may be placed adjacent to each connector port 34 for easy identification in the field. The connector port 34 may also include a factory-installed connector adapter sleeve (not shown) for aligning and maintaining the mating connectors in physical contact. In one embodiment, the connector adapter sleeve may be biased within the adapter to ensure physical contact between the opposed end faces of the connectors. Preferably, the connector ports 34 further provide an environmental seal at the interface between the connectorized optical fibers of the distribution cable and the pre-connectorized drop cables. Unused connector ports 34 may be covered and sealed with a removable cap or plug 65 until the connector port 34 is needed. The twelve connector ports 34 are shown located within the top surface of the cover 28 on angled surfaces 38. The angled surfaces 38 provide a preferred routing direction of the pre-connectorized drop cables. The angled surfaces 38 are recessed from and surrounded on two sides by a protruding portion of the molded cover 28 operable for providing protection to the connector ports 34 during deployment and installation. In below grade deployments, the connection closure 20 may be mounted upon the distribution cable with the connector ports 34 angled in the direction in which the drop cables will be routed.

Referring specifically to FIG. 8, the connection closure 20 is illustrated with the cover 28 opened to show the interior of the closure 20 and its contents. Although not shown, the distribution cable enters the connection closure 20 through a cable opening 22 located within one end wall 40 and exits the closure 20 through a cable opening 22 located within the opposed end wall 40. The distribution cable may be secured to one or more cable brackets positioned adjacent to the appropriate cable opening 22 and secured by the base 26 or end wall 40. The cable bracket may define a notch along its length for securing a conventional cable tie, strap, hose clamp or other fastening mechanism around the distribution cable in a known manner. The cable bracket also aids in retaining the connection closure 20 in place in a desired position along the length of the distribution cable. A plurality of hardware mounting features 48 may be located on the interior of the connection closure 20 for fastening optical hardware, such as optical fiber storage trays, splice trays, coupler trays, routing guides, fiber organizers, etc., to the interior of the connection closure 20. A slack basket (not shown) may be fastened to the hardware mounting features 48 and operable for receiving and storing slack lengths of optical fibers and/or optical fiber buffer tubes. A strain relief bracket 52 may also be secured to the interior of the connection closure 20 using the hardware mounting features 48. The strain relief bracket 52 (which may also be a part of the splice tray) provides strain relief for the optical fibers entering and exiting, for example, a splice tray 66. Splice trays are used when terminated or preterminated optical fibers are spliced in the field, such as when one or more optical fibers of the distribution cable are accessed in the field to create a mid-span access location and spliced to interconnect the distribution cable with one or more drop cables.

The connectors (not shown) of the connectorized optical fibers are routed within the interior cavity of the connection closure 20 and connected to the connector ports 34 on the inside of the closure 20. Although not shown, strain relief devices may be provided for any of the optical fibers within the interior of the base 26 to strain relieve the optical fibers adjacent the distribution cable. With the cover 28 opened as shown in FIG. 8, the interior of the connection closure 20 is readily accessible to a field technician initially installing the connectorized optical fibers into the respective connector ports 34. The field technician may create and route additional connectorized optical fibers to unused connector ports 34, or remove or rearrange optical connections between existing connectorized optical fibers and the connector ports 34. Once the connection closure 20 is initially installed, the field technician may also add, remove or rearrange optical connections between optical fibers of the drop cables and the respective connector ports 34 from the exterior of the connection closure 20 without the need for entering the closure 20. Since the connection closure 20 does not have to be entered to connect, disconnect or reconfigure drop cables, additional drop cables can be connected without disturbing the previously installed drop cables or the contents of the connection closure 20, particularly the relatively delicate connectorized optical fibers and the splice connections between the optical fibers of the distribution cable and the connectorized optical fibers.

As previously described, a shelf 54 may be used to mount a conventional splice organizer or splice tray 66 within the interior of the connection closure 20 to splice terminated or preterminated optical fibers of the distribution cable to pigtails. The splice tray 66 may be mounted to either the top or bottom surface of the shelf 54, or as shown, within a slot provided on the shelf 54. It will be readily apparent and well understood by one of ordinary skill in the art that each terminated or preterminated optical fiber may be spliced to a pigtail in any known manner, such as by fusion or mechanical splicing. The pigtail exits the splice tray 66 and is routed to a connector port 34 located within an external wall of the connection closure 20. The splice tray 66 may be configured to contain any number of splices, or a plurality of splice trays 66 may be utilized. Preferably, the pigtails exit the splice tray 66 at the side closest to the connector port 34 to which the connectorized optical fiber is routed and are strain relieved to the appropriate strain relief bracket 52. In the case of more than one splice tray 66, the splice trays may be positioned in a stacked relationship on the shelf 54 and retained in a known manner, such as by a strap or by a nut secured on a threaded mounting post. As shown, the shelf 54 is secured by conventional fasteners to an interior wall of the base 26 of the connection closure 20 at one or more locations, thus allowing the shelf 54 to be removed for providing access to the splice tray 66 and replaced for storing the splice tray 66.

Regardless, sufficient space is provided in the interior cavity of the base 26 to route the optical fibers of the distribution cable, the connectorized optical fibers and their respective connectors, as well as the express portion of the distribution cable through the interior cavity. In applications in which the distribution cable is accessed and the mid-span access location is factory-prepared, a splice tray 66 may not be needed for connecting the connectorized optical fibers to the respective optical fibers of the distribution cable (e.g., a pre-connectorized fiber optic distribution cable). In this type of application, the shelf 54 and splice tray 66 may be removed and instead a splice organizer may be secured to an interior wall of the connection closure 20 by way of the hardware mounting features 48 to support the factory-prepared splices between the optical fibers of the distribution cable and the connectorized optical fibers. Furthermore, similar optical hardware may be provided for supporting the connectors of any connectorized optical fibers that are not routed to a connector port 34.

Figure 9:
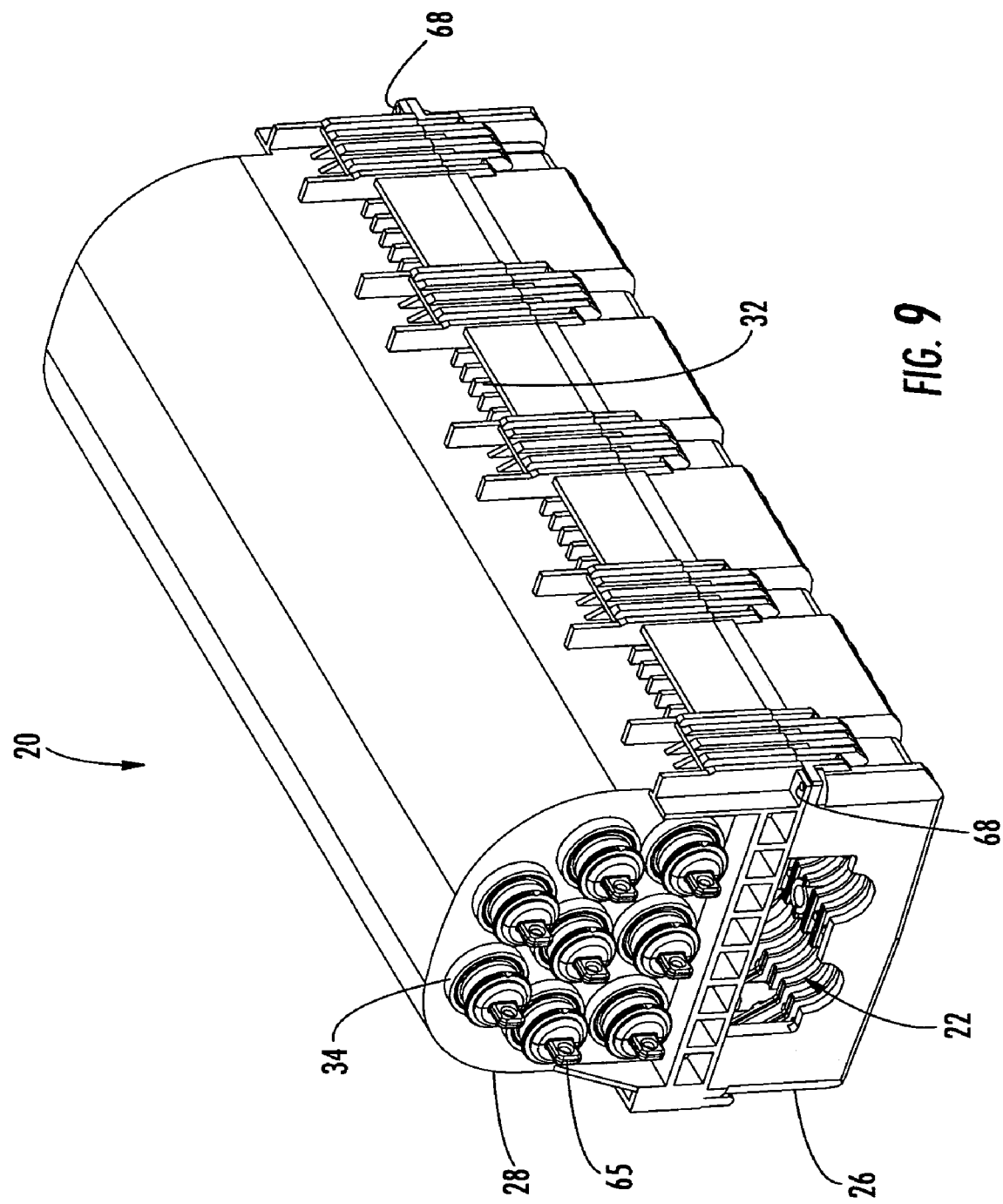
FIG. 9 is a perspective view of an alternative below grade optical connection closure having a plurality of connector ports and distribution cable openings located within an end wall of the closure in accordance with another exemplary embodiment of the present invention.
Figure 10:
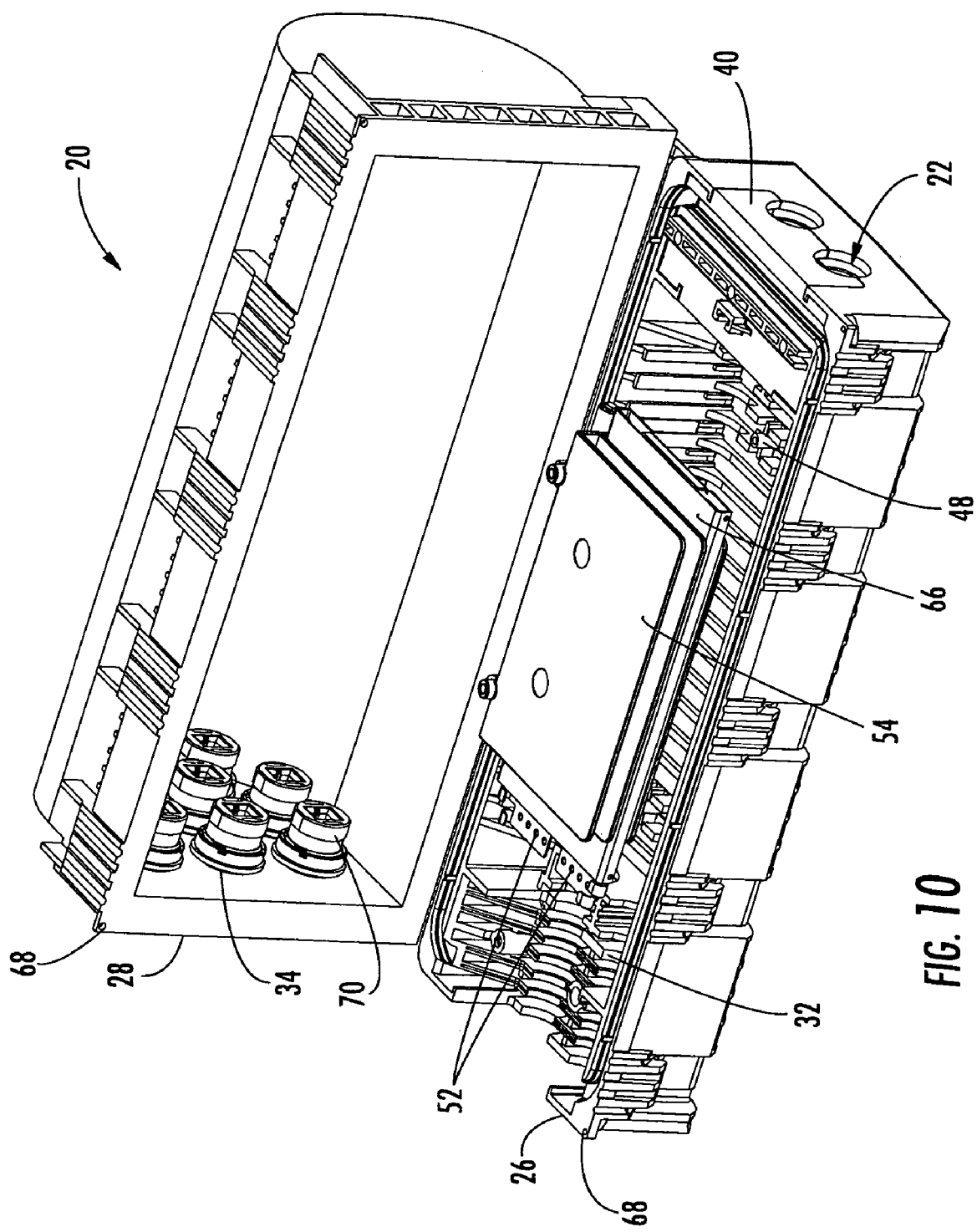
FIG. 10 is a perspective view of the closure of FIG. 9 with the cover in an opened position to show the internal compartment of the closure.

Referring now to FIGS. 9 and 10, a connection closure 20 constructed in accordance with another exemplary embodiment of the present invention is shown. FIG. 9 shows the cover 28 in a closed position, while FIG. 10 shows the cover 28 in an opened position. The embodiment of the connection closure 20 shown in FIGS. 9 and 10 is typically installed in a below grade location, for example, within a hand-hole or vault. However, the connection closure 20 may also be installed in an aerial location, for example on a telephone pole, or in an above ground location within a larger enclosure, such as an above ground cabinet, network terminal or pedestal. For below grade deployments, the connection closure 20 is mounted on a buried distribution cable (not shown) by way of one or more cable openings 22 located within at least one external wall of the connection closure 20. As previously described, the base 26 and the end wall 40 (removed from the base 26 in FIG. 9) define the cable openings 22 for receiving at least one distribution cable through the exterior wall of the connection closure 20. As shown, the end wall 40 is inserted into grooves defined by the base 26 and secured in place around the distribution cable. Fasteners (not shown), such as threaded screws or bolts, may be used to secure the end wall 40 to the base 26. Preferably, the fasteners may only be accessed when the cover 28 is in an opened position. The base 26 and the end wall 40 may also be provided with a water-blocking gel material that provides a sealing function.

The connection closure 20 comprises a base 26 and a cover 28 each made of a lightweight, yet rigid material, such as aluminum, plastic or thermoplastic. The base 26 and cover 28 may be provided with lengthwise and/or widthwise stiffening ribs 32 on either the interior or exterior of the closure 20, or both to strengthen and prevent distortion of the base 26 and cover 28. The base 26 and the cover 28 together are generally "lunch pale" shaped and define an interior cavity. The cover 28 may have any shape that is suitable for housing a plurality of connector ports 34 located within an external wall of the closure 20. As shown, the cover 28 is generally arcuate and dome-shaped and is hingedly affixed to the base 26 along the upper edge of one of the sidewalls at one or more hinge locations and secured to the base 26 at openings 68 that receive threaded screws or bolts, or other known fasteners to secure the cover 28 in the closed position. A sealing gasket (not shown) may also be disposed between the base 26 and the cover 28 to provide a seal against environmental elements such as wind-driven rain. The connection closure 20 may further comprise a pressure valve (not shown) located within an external wall operable for pressurizing the closure 20, as previously described.

The exemplary embodiment of the closure 20 illustrated in FIGS. 9 and 10 comprises eight connector ports 34 for receiving up to eight connectorized optical fibers on the inside of the closure 20 and up to eight pre-connectorized drop cables on the outside of the closure 20. Although the eight connector ports 34 are shown arranged in an arcuate pattern, it is envisioned that the connection closure 20 may be designed to accommodate any desired number of connector ports 34, for example, one, two, three, four, six, eight, etc., on one or both ends of the closure 20. Thus, it is conceivable that the closure 20 may accommodate any desired number of pre-connectorized drop cables. Furthermore, the dimensions and overall size of the connection closure 20 will vary depending on the number of connector ports 34 utilized. Although not shown, identifying indicia may be placed adjacent to each connector port 34 for easy identification in the field. The connector port 34 may also include a factory-installed connector adapter sleeve (not shown) for aligning and maintaining the mating connectors in physical contact. In one embodiment, the connector adapter sleeve may be biased within the adapter to ensure physical contact between the opposed end faces of the connectors. Preferably, the connector ports 34 further provide an environmental seal at the interface between the connectorized optical fibers of the distribution cable and the pre-connectorized drop cables. Unused connector ports 34 may be covered and sealed with a removable cap or plug 65 until the connector port 34 is needed. The eight connector ports 34 are shown located within one end of the cover 28 and generally parallel to the direction of the distribution cable. In below grade deployments, the connection closure 20 may be mounted upon the distribution cable with the connector ports 34 oriented in the direction in which the drop cables will be routed.

Referring specifically to FIG. 10, the connection closure 20 is illustrated with the cover 28 opened to show the interior of the closure 20 and its contents. Although not shown, the distribution cable enters the connection closure 20 through a cable opening 22 located within one end wall 40 and exits the closure 20 through a cable opening 22 located within the opposed end wall 40. The distribution cable may be secured to one or more cable brackets positioned adjacent to the appropriate cable opening 22 and secured by the base 26 or end wall 40. The cable bracket may define a notch along its length for securing a conventional cable tie, strap, hose clamp or other fastening mechanism around the distribution cable in a known manner. The cable bracket also aids in retaining the connection closure 20 in place in a desired position along the length of the distribution cable. A plurality of hardware mounting features 48 may be located on the interior of the connection closure 20 for fastening optical hardware, such as optical fiber storage trays, splice trays, coupler trays, routing guides, fiber organizers, etc., to the interior of the connection closure 20. A slack basket (not shown) may be fastened to the hardware mounting features 48 and operable for receiving and storing slack lengths of optical fibers and/or optical fiber buffer tubes. A strain relief bracket 52 may also be secured to the interior of the connection closure 20 using the hardware mounting features 48. The strain relief bracket 52 (which may also be a part of the splice tray) provides strain relief for the optical fibers entering and exiting, for example, a splice tray 66. Splice trays are used when terminated or preterminated optical fibers are spliced in the field, such as when one or more optical fibers of the distribution cable are accessed in the field to create a mid-span access location and spliced to interconnect the distribution cable with one or more drop cables.

The connectors (not shown) of the connectorized optical fibers are routed within the interior cavity of the connection closure 20 and connected to the connector ports 34 on the inside of the closure 20. Although not shown, strain relief devices may be provided for any of the optical fibers within the interior of the base 26 to strain relieve the optical fibers adjacent the distribution cable. With the cover 28 opened as shown in FIG. 10, the interior of the connection closure 20 is readily accessible to a field technician initially installing the connectorized optical fibers into the respective connector ports 34. The field technician may create and route additional connectorized optical fibers to unused connector ports 34, or remove or rearrange optical connections between existing connectorized optical fibers and the connector ports 34. Once the connection closure 20 is initially installed, the field technician may also add, remove or rearrange optical connections between optical fibers of the drop cables and the respective connector ports 34 from the exterior of the connection closure 20 without the need for entering the closure 20. Since the connection closure 20 does not have to be entered to connect, disconnect or reconfigure drop cables, additional drop cables can be connected without disturbing the previously installed drop cables or the contents of the connection closure 20, particularly the relatively delicate connectorized optical fibers and the splice connections between the optical fibers of the distribution cable and the connectorized optical fibers.

As previously described, a shelf 54 may be used to mount a conventional splice organizer or splice tray 66 within the interior of the connection closure 20 to splice terminated or preterminated optical fibers of the distribution cable to pigtails. The splice tray 66 may be mounted to either the top or bottom surface of the shelf 54, or as shown, within a slot provided on the shelf 54. It will be readily apparent and well understood by one of ordinary skill in the art that each terminated or preterminated optical fiber may be spliced to a pigtail in any known manner, such as by fusion or mechanical splicing. The pigtail exits the splice tray 66 and is routed to a connector port 34 located within an external wall of the connection closure 20. The splice tray 66 may be configured to contain any number of splices, or a plurality of splice trays 66 may be utilized. Preferably, the pigtails exit the splice tray 66 at the side closest to the connector ports 34 and are strain relieved to the appropriate strain relief bracket 52. In the case of more than one splice tray 66, the splice trays may be positioned in a stacked relationship on the shelf 54 and retained in a known manner, such as by a strap or by a nut secured on a threaded mounting post. As shown, the shelf 54 is secured by conventional fasteners to an interior wall of the base 26 of the connection closure 20 at one or more locations, thus allowing the shelf 54 to be removed for providing access to the splice tray 66 and replaced for storing the splice tray 66.

The exemplary embodiments of a connection closure according to the present invention shown and described herein provide a number of significant advantages over previously known aerial and below grade splice closures. For purposes of example only, and not by way of limitation, a connection closure constructed in accordance with the invention provides a field technician with the ability to readily connect, disconnect and reconfigure pre-connectorized fiber optic drop cables to "quick connect" connector ports located within an external wall of the closure. In addition, connectorized optical fibers of the distribution cable are routed to the connector ports on the inside of the closure during installation, thus eliminating the need for a field technician to enter the closure to make subsequent optical connections of the pre-connectorized drop cables to the terminated or preterminated optical fibers of the distribution cable. Thus, the connection closure of the present invention eliminates the need for performing fusion and mechanical splices in the field once the optical fibers of the distribution cable are connectorized. It should be noted that a connection closure constructed in accordance with the invention permits numerous configurations of aerial, buried and above ground closures for receiving pre-connectorized fiber optic drop cables to be interconnected with a distribution cable.

The foregoing is a description of various embodiments of the invention that are given here by way of example only. Although an optical connection closure having at least one connector port located within an external wall of the closure has been described with reference to preferred embodiments and examples thereof, other embodiments and examples may perform similar functions and/or achieve similar results. All such equivalent embodiments and examples are within the spirit and scope of the present invention and are intended to be covered by the appended claims.

That which is claimed is:

1. An optical connection closure for use at a branch point in a fiber optic communications network to interconnect an optical fiber of a distribution cable with an optical fiber of a pre-connectorized fiber optic drop cable, the closure comprising:
   a base;
   a cover affixed to the base, the base and the cover defining an interior cavity;
   at least one cable opening for receiving a portion of the distribution cable within the interior cavity;
   at least one connector port located within an external wall of the closure for receiving the optical fiber of the distribution cable on the inside of the closure and for receiving the pre-connectorized fiber optic drop cable on the outside of the closure; and
   at least one splice tray positioned within the interior cavity for splicing the optical fiber of the distribution cable to a pigtail to create a connectorized optical fiber that is routed to the at least one connector port on the inside of the closure.

2. The closure according to claim 1, further comprising an end wall and wherein the at least one connector port is located within the end wall.

3. The closure according to claim 1, further comprising a connector adapter sleeve disposed within the at least one connector port for aligning and maintaining the connectorized optical fiber and the pre-connectorized fiber optic drop cable in physical contact.

4. The closure according to claim 1, wherein the closure is deployed in one of an aerial location, a buried location and an above ground location.

5. The closure according to claim 1, wherein one of the base and the cover is breathable.

6. The closure according to claim 1, wherein the base and the cover are sealed and pressurized.

7. The closure according to claim 1, wherein the at least one connector port is configured to permit a field technician to connect, disconnect and reconfigure the pre-connectorized fiber optic drop cable without entering the closure.

8. An optical connection closure for use at a branch point in a fiber optic communications network, the closure comprising:
   a distribution cable comprising at least one connectorized optical fiber and a mid-span access location;
   a base;
   a cover affixed to the base such that the base and the cover define an interior cavity;
   an end wall defining at least one cable opening for receiving the distribution cable such that the closure is mounted on a portion of the distribution cable including the mid-span access location; and
   at least one connector port located in an external wall of one of the base, the cover and the end wall, the connector port receiving the at least one connectorized optical fiber on the inside of the closure;

wherein the mid-span access location is factory-prepared such that the at least one optical fiber of the distribution cable is preterminated and wherein the preterminated optical fiber of the distribution cable is connectorized in the field.

9. The closure according to claim 8, wherein the preterminated optical fiber of the distribution cable is spliced to a pigtail.

10. The closure according to claim 8, wherein the at least one connector port receives a pre-connectorized drop cable on the outside of the closure.

11. The closure according to claim 10, wherein the at least one connector port is configured to permit a field technician to connect, disconnect and reconfigure the pre-connectorized drop cable without entering the closure.

12. The closure according to claim 10, further comprising a connector adapter sleeve disposed within the at least one connector port for aligning and maintaining the connectorized optical fiber and the pre-connectorized drop cable in physical contact.

13. The closure according to claim 8, further comprising a shelf affixed to the base within the interior cavity and at least one splice tray positioned on the shelf and wherein the shelf is movable relative to the base between an opened position for providing access to the splice tray and a closed position for storing the splice tray.

14. The closure according to claim 8, wherein the closure is deployed in one of an aerial location, a buried location and an above ground location.

15. The closure according to claim 8, wherein one of the base and the cover is breathable.

16. The closure according to claim 8, wherein the base and the cover are sealed and pressurized.

17. An optical connection closure for use at a branch point in a fiber optic communications network, the closure comprising:
   a distribution cable comprising at least one connectorized optical fiber and a mid-span access location;
   a base;
   a cover affixed to the base such that the base and the cover define an interior cavity;
   an end wall defining at least one cable opening for receiving the distribution cable such that the closure is mounted on a portion of the distribution cable including the mid-span access location; and
   at least one connector port located in an external wall of one of the base, the cover and the end wall, to connector port receiving the at least one connectorized optical fiber on the inside of the closure;
   wherein the mid-span access location is field-prepared and the at least one optical fiber of the distribution cable is terminated and connectorized in the field.

18. The closure according to claim 17, wherein the terminated optical fiber of the distribution cable is spliced to a pigtail.

* * * * *